(12) United States Patent
Kawano et al.

(10) Patent No.: US 10,568,331 B2
(45) Date of Patent: Feb. 25, 2020

(54) AUXILIARY MATERIAL ACCOMMODATING CONTAINER AND AUTOMATIC BREAD MAKING MACHINE

(71) Applicant: Zojirushi Corporation, Osaka-shi (JP)

(72) Inventors: Kimihiro Kawano, Osaka (JP); Takuya Ishii, Osaka (JP)

(73) Assignee: Zojirushi Corporation, Osaka (JP)

( * ) Notice: Subject to any disclaimer, the term of this patent is extended or adjusted under 35 U.S.C. 154(b) by 464 days.

(21) Appl. No.: 15/479,366

(22) Filed: Apr. 5, 2017

(65) Prior Publication Data

US 2017/0325464 A1 Nov. 16, 2017

(30) Foreign Application Priority Data

May 13, 2016 (JP) ................. 2016-097375

(51) Int. Cl.
| | |
|---|---|
| *A21C 1/14* | (2006.01) |
| *A21B 7/00* | (2006.01) |
| *A21C 1/02* | (2006.01) |

(52) U.S. Cl.
CPC .............. *A21C 1/142* (2013.01); *A21B 7/005* (2013.01); *A21C 1/02* (2013.01); *A21C 1/149* (2013.01); *A21C 1/1485* (2013.01)

(58) Field of Classification Search
CPC ......... A21B 7/005; A21C 1/02; A21C 1/1485; A21C 1/142
USPC ................................ 220/522, 524
See application file for complete search history.

(56) References Cited

U.S. PATENT DOCUMENTS

| | | | |
|---|---|---|---|
| 2,628,738 A * | 2/1953 | Hilldale | A47J 27/082 220/522 |
| 4,264,007 A * | 4/1981 | Hunt | B65D 51/2842 206/219 |
| 4,984,687 A * | 1/1991 | Hanna | B25H 3/02 206/373 |
| 5,615,605 A | 4/1997 | Kakimoto et al. | |

(Continued)

FOREIGN PATENT DOCUMENTS

| | | |
|---|---|---|
| JP | 1145329 U | 10/1989 |
| JP | 3191645 B2 | 5/2001 |
| JP | 2010000310 A | 1/2010 |

*Primary Examiner* — Ibrahime A Abraham
*Assistant Examiner* — John J Norton
(74) *Attorney, Agent, or Firm* — The Webb Law Firm

(57) ABSTRACT

To allow simplification of the operating mechanism for automatic charging of auxiliary material, thus enabling compactization/simplification of the automatic bread making machine as well as increased readiness of its cleaning. An auxiliary material accommodating container detachably attachable to an automatic bread making machine. The container includes a base body 31, a first accommodating section 31a, a second accommodating section 31b, a first opening/closing member (a lid member 32 and a frame member 33) and a second opening/closing member (a yeast lid member 34). The first accommodating section 31a and the second accommodating section 31b accommodate auxiliary materials to be charged to bread. The first opening/closing member is pivotable relative to the base body 31 about a pivot axis G to open/close the first accommodating section 31a. The second opening/closing member is pivotable relative to the base body 31 about the pivot axis G to open/close the second accommodating section 31b.

5 Claims, 7 Drawing Sheets

(56) References Cited

U.S. PATENT DOCUMENTS

| | | | | |
|---|---|---|---|---|
| 7,658,298 B2* | 2/2010 | Merey | ............... | B65D 81/3222 |
| | | | | 220/522 |
| 2014/0079844 A1* | 3/2014 | Zhang | .................. | A21B 7/005 |
| | | | | 426/18 |

* cited by examiner

AUXILIARY MATERIAL ACCOMMODATING CONTAINER AND AUTOMATIC BREAD MAKING MACHINE

CROSS-REFERENCE TO RELATED APPLICATION

This application claims priority to Japanese Patent Application No. 2016-097375 filed May 13, 2016, the disclosure of which is hereby incorporated in its entirety by reference.

TECHNICAL FIELD

The present invention relates to an auxiliary material accommodating container detachably attachable to an automatic bread making machine and relates. The invention relates also to the automatic bread making machine.

BACKGROUND ART

In recent years, with popularization of an automatic bread making machine for home use, it has become readily possible to bake and enjoy bread even at home. As such automatic bread making machine, there is known a machine that allows automatic charging of auxiliary material such as resin, nuts, yeast, etc. in the course of a bread making process.

For instance, in a full-automatic bread making machine disclosed in Patent Document 1, in a lid of a main body case, there are incorporated a yeast feeding unit and a dry-fruits feeding unit. After completion of dough aging step, a solenoid is activated to open an opening/closing plate and yeast is fed from the yeast feeding unit into a bread baking tray. In the middle of a subsequent dough mixing/kneading step, the solenoid is activated to open the opening/closing plate and resin is fed from the dry-fruits feeding unit into the bread baking tray. The solenoid is incorporated within the main body case and a mechanism for opening the opening/closing plate is incorporated within the lid.

Similarly, in an automatic bread making machine disclosed in Patent Document 2 too, two material charging (feeding) units are incorporated within its lid body. Upon activation of a solenoid incorporated in a main machine body, a lever incorporated in the lid body is moved to pivot a material container together with a door shaft, thus charging auxiliary material into bread dough.

PRIOR ART DOCUMENTS

Patent Documents

[Patent Document 1] Japanese Unexamined Utility Model Application Publication Hei. No. 1-145329
[Patent Document 2] Japanese Patent No. 3191645, its description.

SUMMARY

Problem to be Solved by Invention

With the conventional automatic bread making machines, the operating mechanisms for automatic charging of auxiliary material are complicated, thus inviting enlargement/complication of the automatic bread making machine. Further, in some cases, cleaning was difficult.

The present invention has been made in view of the above-described problems and its object is to allow simplification of the operating mechanism for automatic charging of auxiliary material, thus enabling compactization/simplification of the automatic bread making machine as well as increased readiness of its cleaning.

Solution

For accomplishing the above-noted object, according to a characterizing feature of an auxiliary material accommodating container detachably attachable to an automatic bread making machine, wherein:

the container includes a base body, a first accommodating section, a second accommodating section, a first opening/closing member and a second opening/closing member;

the first opening/closing member is pivotable relative to the base body about a pivot axis to open/close the first accommodating section; and the second opening/closing member is pivotable relative to the base body about the pivot axis to open/close the second accommodating section.

With the above-described characterizing arrangement, both the first opening/closing member and the second opening/closing member are pivotable relative to the base body about a common pivot axis to open/close the first accommodating section and the second accommodating section, respectively. Thus, the operating mechanism for these opening/closing operations can be made simple and compact. Further, thanks to the shared use of the pivot axis, the auxiliary material accommodating container per se can be made simple and compact in its arrangement. In addition, as the auxiliary material accommodating container includes the first accommodating section and the second accommodating section and is detachably attachable to the automatic bread making machine, this auxiliary material accommodating container can be detached from the automatic bread making machine for cleaning, so readiness of cleaning of the automatic bread making machine can be increased.

According to a further characterizing feature of the an auxiliary material accommodating container relating to the present invention:

the container includes a braking mechanism for braking a pivotal movement of the first opening/closing member;

the braking mechanism includes a first braking member provided in the first opening/closing member and a second braking member provided in the second opening/closing member, the first braking member and the second braking member coming into contact with each other to provide a braking state, the first braking member and the second braking member moving away from each other to provide a non-braking state;

the first opening/closing member selectively assumes a closing posture to close the first accommodating section and an opening posture when the first opening/closing member is pivoted relative to the base body to open the first accommodating section, then becoming still; and the braking mechanism provides the braking state in the middle of transition of the first opening/closing member from the closing posture to the opening posture, whereas the braking mechanism provides the non-braking state when the first opening/closing member assumes the opening posture.

When auxiliary material is discharged from the auxiliary material accommodating container in the middle of a bread making process in the automatic bread making machine, at least the first opening/closing member is to be opened. In this, if no means for suppressing/braking the pivotal motion is provided for the first opening/closing member which is urged by an elastic member, a shock/noise will be generated disadvantageously in association with opening of the first opening/closing member. Further, for reliable discharging of the auxiliary material, it is desired that the first opening/closing member will be opened fully. Then, with the above-described characterizing feature, the braking mechanism provides the braking state in the middle of transition of the first opening/closing member from the closing posture to the opening posture, so that the pivotal motion of the first opening/closing member is decelerated, thus suppressing shock/noise advantageously. And, since the braking mechanism provides the non-braking state when the first opening/closing member assumes the opening posture, the first opening/closing member can be opened fully.

According to a still further characterizing feature of the auxiliary material accommodating container relating to the present invention:

the first opening/closing member includes a lid member and a frame member, the lid member and the frame member are pivotable relative to the base body about the pivot axis to open the first accommodating section, the lid member and the frame member being urged by an elastic member in a direction for opening the first accommodating section;

the first opening/closing member selectively assumes a closing state in which the lid member and the frame member are closed to each other to close the first accommodating section, a first opening state in which the lid member is opened to open the first accommodating section and a second opening state in which the lid member and the frame member together are opened to open the first accommodating section; and a pivoting speed of the lid member at the time of transition from the closing state to the first opening state is set lower than a pivoting speed of the lid member and the frame member at the time of transition from the closing state to the second opening state.

With the above-described characterizing arrangement, the lid member and the frame member are urged by the elastic member. In this, since the pivoting speed of the lid member at the time of transition from the closing state to the first opening state is set lower than the pivoting speed of the lid member to the second opening state. vibration/shock that occurs in case the first accommodating section is opened by opening the lid member alone is made milder than vibration/shock that occurs in case the first accommodating section is opened by opening both the lid member and the frame member. Here, for instance, when auxiliary material is to be accommodated in the auxiliary material accommodating container, if the first accommodating section is opened after completion of accommodation of the auxiliary material in the second accommodating section, the lid member alone will be opened in a gentle manner to reduce vibration/shock, whereby scattering of the auxiliary material from the second accommodating section can be suppressed. Namely, with the above-described characterizing feature, working performance at the time of accommodation of auxiliary material in the auxiliary material accommodating container can be improved.

According to a still further characterizing feature of the auxiliary material accommodating container relating to the present invention, in the second opening state, the frame member applies a force to the lid member in a direction for opening this lid member.

With the above-described characterizing arrangement, in the second opening state, the frame member applies a force to the lid member in a direction for opening this lid member. So, the lid member and the frame member will be fully opened together, whereby the auxiliary material can be discharged in a reliable manner.

According to a characterizing feature of an automatic bread making machine for accomplishing the above-noted object, the machine comprises the auxiliary material accommodating container described above and a bread case;

wherein the bread case accommodates therein bread materials; and the auxiliary material accommodating container is disposed upwardly of the bread case.

With the above-described characterizing feature, since the automatic bread making machine includes the auxiliary material accommodating container described above, simplification and compactization of the arrangement and improvement of cleaning facility are made possible.

According to a further characterizing feature of the automatic bread making machine relating to the present invention:

the machine further includes a casing that accommodates the bread case;

the casing includes a casing lid for opening/closing the top of the casing;

the auxiliary material accommodating container is attached to the casing lid at a position where the pivot axis is overlapped with an approximate center of the bread case as seen in a plan view;

the first opening/closing member assumes a posture along an inner face of the casing lid when the first accommodating section is opened; and the second opening/closing member assumes a posture along the inner face of the casing lid when the second accommodating section is opened.

In the case of attaching the auxiliary material accommodating container to the casing lid, in order to prevent the bread dough which has expanded by fermentation from coming contact with the auxiliary material accommodating container, it is necessary to dispose the auxiliary material accommodating container away from the bread case. With the above-described characterizing arrangement, the container is attached to the casing lid at a position where the pivot axis is overlapped with an approximate center of the bread case as seen in a plan view, and both the first opening/closing member and the second opening/closing member assume respective postures along the inner face of the casing lid at the time of opening. Thus, the distance between the auxiliary material accommodating container and the bread case can be reduced. Therefore, the automatic bread making machine can be made even more compact.

According to a still further characterizing feature of the automatic bread making machine relating to the present invention:

the auxiliary material accommodating container has a partition wall that partitions between the first accommodating section and the second accommodating section; and when the auxiliary material accommodating container is attached to the casing lid, the partition wall is disposed as a position offset from the center of the bread case as seen in a plan view.

When bread dough expands inside the bread case, it often happens that the expanded bread dough has maximum height at the center of the bread case. If the partition wall were disposed at the center, the distance between the auxiliary material accommodating container and the bread case would need to be increased in order to prevent contact between this partition wall and the expanded bread dough. Then, with the above-described characterizing arrangement, since the partition wall is disposed as a position offset from the center of the bread case, the distance between the auxiliary material accommodating container and the bread case can be further reduced. Therefore, the automatic bread making machine can be made even more compact.

EMBODIMENTS

Figure 1:
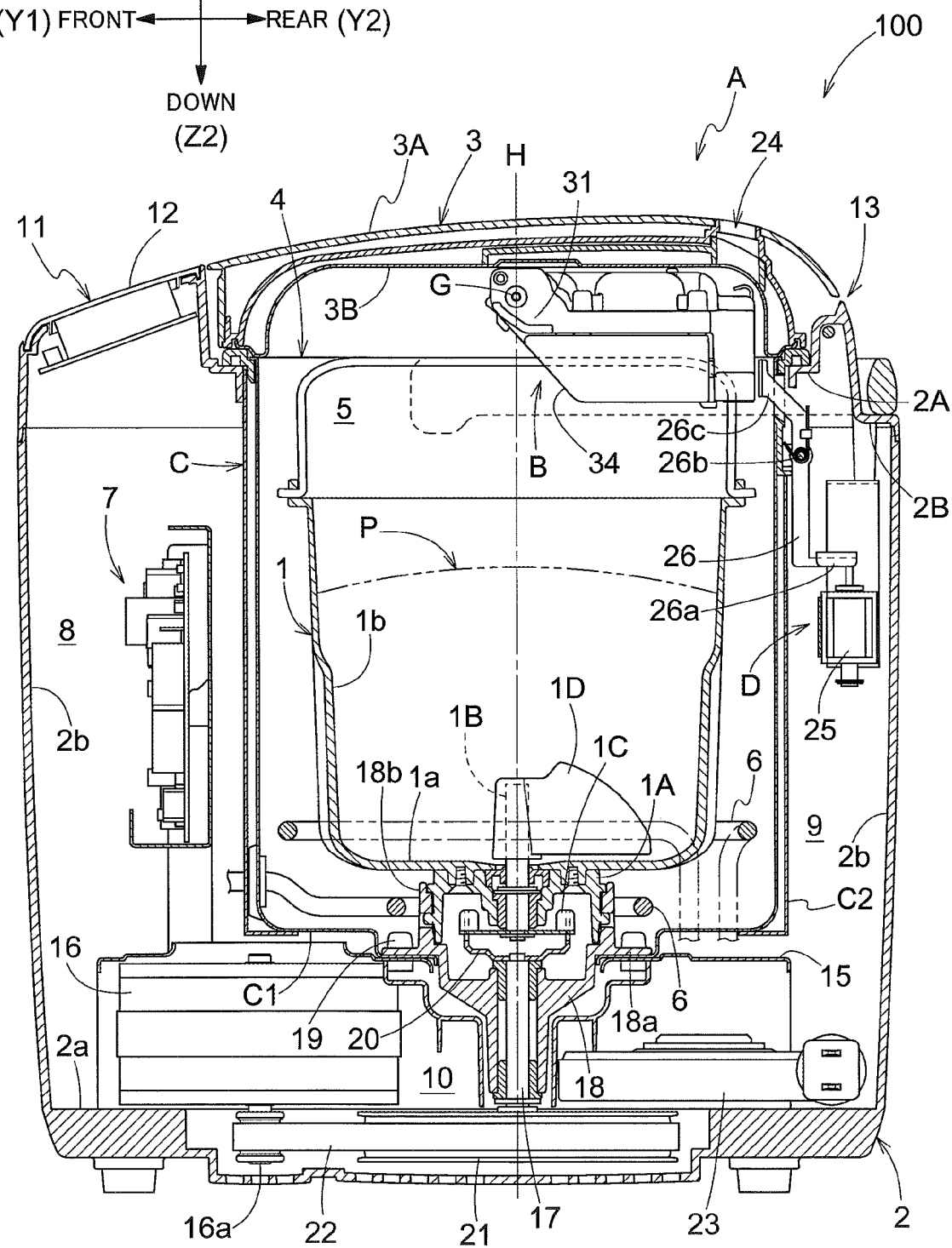
FIG. 1 is a section view showing an arrangement of an automatic bread making machine.

<Arrangement and Operations of Automatic Bread Making Machine>

Next, an arrangement and operations of an automatic bread making machine relating to this embodiment will be described in details. An automatic bread making machine 100 includes a bottomed tubular bread case 1 for accommodating an amount of bread making materials therein, a main body A having a bottomed tubular casing C that accommodates the bread case 1 via an opening portion 4 and a housing 2 that covers the outer side of the casing C, a lid body 3 capable of opening/closing the opening portion 4 of the casing C, an auxiliary material accommodating container B mounted on an inner face side of the lid body 3, a lid opening mechanism D for opening the auxiliary material accommodating container B, an electric heater 6 mounted within a heating chamber 5 formed by the casing C and the lid body 3, a controlling section 7 for controlling operations of the electric heater 6 and a lid-opening driving solenoid 25 or the like to be described later, and so on. The auxiliary material accommodating container B accommodates auxiliary materials therein. In the instant embodiment, the 'auxiliary materials' include such food stuffs as resin, nuts, etc., as well as yeast E.

Incidentally, in the explanation given below, as shown in the drawings, the side of the automatic bread making machine 100 on which side the lid body 3 is disposed will be referred to as an upper side (upper direction) or Z1 side (Z1 direction), the side thereof on which a display section 12 is disposed will be referred to as a front side (front direction) or Y1 side (Y1 direction), the side on which a hinge mechanism 13 is disposed will be referred to as a rear side (rear direction) or Y2 side (Y2 direction). Further, the right side of the automatic bread making machine 100 as seen from its front will be referred to as the right side (right direction) or the X1 side (X1 direction), and the left side will be referred to as the left side (left direction) or the X2 side (X2 direction), respectively. Incidentally, in FIGS. 4-9, the auxiliary material accommodating container B is shown in various orientations. But, in any case, the directions or the like will always be explained relative to the disposing direction of the auxiliary material accommodating container B as shown in FIG. 1 as a reference therefor.

The housing 2 is formed like a bottomed box that has an approximately rectangular shape which is slightly elongated in the front-rear direction as seen in the plan view and that is open at its top and has a bottom wall portion 2a and a lateral wall portion 2b. At an approximate center position in the front-rear direction and left-right direction inside the housing 2, there is provided the bottomed tubular casing C having an approximately rectangular shape slightly elongated in the front-rear direction and has the opening portion 4 at its top.

And, between respective opposing faces of the bottom wall portion C1 and the respective outer faces of the lateral wall portion C2 of the casing C and the bottom wall portion 2a and the respective inner faces of the lateral wall portion 2b of the housing 2, a main body space is formed. The principal portion of this main body space consists of a front space 8 formed on the front side (left side in FIG. 1) of the casing C, a rear space 9 formed on the rear side (right side in FIG. 1) of the casing C, and a transmission section accommodating space 10 which is communicated to the lower sides of the front space 8 and the rear space 9.

In an upper portion of the housing 2, on the front side thereof, an operation portion 11 and the display portion 12 are provided. The operation portion 11 includes operating keys for instructing start and stop of the bread making machine (including start and stop of a timer reservation) as well as a time adjustment key, a cancellation key, a course selection key for selecting a braking course, etc. In the display portion 12, a liquid crystal panel is provided to be able to display contents instructed by the operation portion 11, a current operation state of the bread making machine (e.g. a selected baking course), and so on.

In the upper portion of the housing 2, an opening is formed on the rear side of the operation portion 11 and the display portion 12, and at a rear edge portion 2A of this opening a hinge mechanism 13 is provided. This hinge mechanism 13 is configured to support the lid body 3 pivotally about a pivot axis extending along the left-right direction (the front-rear direction of the illustration) of the main body A. By a pivotal operation of this lid body 3, the opening of the housing 2 and the opening portion 4 of the casing C are opened/closed.

The casing C has a bottomed tubular shape in the form of an approximately rectangular plate slightly elongate in the front-rear direction as seen in the plan view. The casing C includes a bottom wall portion C1 having a circular opening at its approximate center and a lateral wall portion C2 extending upwards from the outer circumferential edge of the bottom wall portion C1 integrally therewith. The lateral wall portion C2 has a double-walled construction consisting of an inner side lateral wall portion (not shown) having a shape which is roundish at its four corners and an outer side lateral wall portion (not shown) fixed to the inner side lateral wall portion in such a manner as to cover the outer side of the latter and having a shape whose four corners are more angular than those of the inner side lateral wall portion as seen in the plan view.

In the lower portion of the bottom wall portion C1, that is, in the transmission section accommodating space 10, there is provided a base member 15 that has an approximately rectangular shape slightly elongate in the front-rear direction as seen in the plan view and having its front side more elongate than the bottom wall portion C1 of the casing C and having an approximately inverted U-shape as seen in a front view (seen in the front-rear direction). This base member 15 is fixed via screws or the like to the bottom wall portion 2a of the housing 2 and has a circular opening at the approximate center thereof.

In the circular opening of the bottom wall portion C1 of the casing C and the circular opening of the base member 15, there are provided a base side driven shaft 17 driven to rotate as receiving a rotational force from an electric motor 16 and a bearing portion 18 for this base driven side driven shaft 17. And, a flange portion 18a which extends in a circular form on the radial outer side at the upper side portion of the bearing portion 18, a circumferential edge portion of the circular opening of the bottom wall portion C1 and the circumferential edge portion of the circular opening of the base member 15 are fixed in this mentioned order from the upper side via screws so as to be overlapped with each other in the vertical direction.

In the flange portion 18a of the bearing portion 18, at a position thereof on more radially outer side than the portion fixed via the screw 19, a cylindrical bread case holding portion 18b is formed to project upwards. Namely, the bread case holding portion 18b is formed to project upwards from the bottom wall portion C1 of the casing C.

In the cylindrical bread case holding portion 18b, at each of its positions opposed to each other in the diameter direction, there is formed an L-shaped groove (not shown) having a vertical groove that extends downwards from the upper end portion of this bread case holding portion 18b and a circumferential groove that extends along the circumferential direction from the lower end portion of the vertical groove, so as to allow fixing by insertion of a pair of fixing pins provided in the bread case 1. Namely, the pair of L-shaped grooves and the pair of fixing pins provide a bayonet structure for fixedly holding the bread case 1 to the bread case holding portion 18b.

To an upper end portion of the base side driven shaft 17 mounted relatively rotatably at the center of the bearing portion 18, a bottomed cylindrical connection tool 20 centering about the base side driven shaft 17 is mounted to be disposed on the radial inner side (inner side) of the cylindrical bread case holding portion 18b and rotatable together with this base side driven shaft 17.

Further, in the transmission section accommodating space 10, there are mounted the electric motor 16 disposed forwardly of the bearing portion 18, a pulley 21 fixed to the base side driven shaft 17 projecting downwards from the bearing portion 18 and rotatable together with this bearing portion 18, a timing belt 22 wound around a drive shaft 16a of the electric motor 16 and the pulley 21, and an electric cable accommodating portion 23 provided rearwardly of the bearing portion 18. Therefore, by the electric motor 16, the base side driven shaft 17 and the connection tool 20 are rotatably driven.

The bread case 1 is formed as a bottomed cylindrical body having four roundish corners as seen in a plan view and an approximately rectangular shape slightly elongate in the front-rear direction and open at the top, the case 1 including a bottom wall portion 1a and a lateral wall portion 1b. To a lower face of the center portion of the bottom wall portion 1a of the bread case 1, there is integrally attached a cylindrical bread case base 1A for supporting the bread case 1 mounted thereon.

The bread case 1 is mounted inside the case C (inside the heating chamber 5), with the bread case base 1A being engaged within the bread case holding portion 18b and the fixing pins for the bread case base 1A being inserted into the L-shaped grooves of the bread case holding portion 18b.

Namely, in the bottom wall portion C1 of the casing C, there is provided the tubular bread case holding portion 18b projecting upward from the bottom wall portion C1 of the casing C and holding the bottom wall portion 1a of the bread case 1 as being fixed within the heating chamber 5.

Further, at the center of the bottom wall portion 1a of the bread case 1, a bread case side driven shaft 1B is supported to be rotatable about the vertical axis and to a projecting shaft portion of the bread case side driven shaft 1B which projects downwards from the bottom wall portion 1a of the bread case 1, there is fixed a disc-like driven side connection tool 1C which is rotatable together with this bread case side drive shaft 1B.

As this driven side connection tool 1C is fitted within a pair of mutually opposed recesses of the connection tool 20, the driven side connection tool 1C and the connection tool 20 are coupled to each other for force transmission.

Further, to a shaft portion of the bread case side driven shaft 1B which projects upwards from the bottom wall portion 1a inside the bread case 1 (inside of the bread case 1), a kneading blade 1D is detachably attached. This kneading blade 1D is configured to be rotatable about the bread case side driven shaft 1B together with this bread case side driven shaft 1B, inside the bread case 1. With this, bread making materials can be mixed and kneaded inside the bread case 1.

The lid body 3 has an approximately inverted U-shape as seen in a vertical sectional view and as described above, the lid body 3 is configured to be pivotable about the pivot axis extending along the left-right direction of the casing C (the front-rear direction of the FIG. 1 illustration) by means of the hinge mechanism 13. In association with this pivotal motion, the lid body 3 can open/close the opening portion 4 of the casing C.

Further, the lid body 3 includes an outer lid 3A disposed at an upper portion and a heat shielding plate 3B (casing lid) as an inner lid disposed at a lower portion. As the heat shielding plate 3b closes the opening portion 4 of the casing C, this heat shielding plate 3B and the casing C together form the heating chamber 5.

Further, at a rear end of the upper face of the lid body 3, there is provided a steam port 24 which establishes communication between the heating chamber 5 and the outside.

A lid opening mechanism D is disposed in a rear space 9 inside the housing 2. This lid opening mechanism D includes a solenoid 25, a link member 26, a solenoid 27, and a link member 28. The solenoid 25 is disposed on the right side (the front side in the FIG. 1 illustration) of the solenoid 27. The link member 26 is disposed on the right side (the front side in the FIG. 1 illustration) of the link member 28.

The solenoid 25 is activated by a command from the controlling section 7 to push up an upper end portion 26a of the link member 26. Then, the link member 26 is pivoted counterclockwise about a pivot shaft 26b and an upper end portion 26c collapses forwardly, thus pushing a frame locking member 44 (to be described later) of the auxiliary material accommodating container B. With this, the lid member 32 and the frame member 33 of the auxiliary material accommodating container B are opened.

The solenoid 27 is activated by a command from the controlling section 7 to push up a lower end portion 28a of the link member 28. Then, the link member 28 is pivoted counterclockwise about a pivot shaft 28b and an upper end portion 28c collapses forwardly, thus pushing a yeast lid locking member 46 (to be described later) of the auxiliary material accommodating container B. With this, the yeast lid member 34 of the auxiliary material accommodating container B is opened.

<Auxiliary Material Accommodating Container>

The auxiliary material accommodating container B is a container configured to accommodate therein auxiliary materials such as food stuff F (resin, nuts, etc.) or yeast E to be added to bread and detachably attached to an inner face of the heat shielding plate 3B of the lid body 3. The auxiliary material accommodating container B, as shown in FIGS. 4-7, a base body 31, a lid member 32 (a first opening/closing member), a frame member 33 (a first opening/closing member), and the yeast lid member 34 (a second opening/closing member). The auxiliary material accommodating container B, as shown in FIG. 1, is attached to the inner face of the heat shielding plate 3B of the lid body 3 at a position where a pivot axis X to be described later intersects a centerline H of the bread case 1 and under a posture where the pivot axis G extends parallel with the left-right direction (X1 direction, X2 direction). That is, the auxiliary material accommodating container B is attached to the heat shielding plate 3B at a position where the pivot axis G is overlapped with the center of the bread case 1 as seen in the plan view (viewed in the Z2 direction).

<Base Body>

The base body 31 is a box-like member which is open on the Z2 side. In this base body 31, there are formed an accommodating portion 31a (a first accommodating portion) for accommodating the food stuff F and a yeast accommodating portion 31b for accommodating the yeast E. The accommodating portion 31a and the yeast accommodating portion 31b both are formed as portions that have an opening on the Z2 side and are recessed on the Z1 side. The accommodating portion 31a and the yeast accommodating portion 31b are formed adjacent each other in this order along the X1 direction, and between these, a partition wall 31d is formed. This partition wall 31d is a wall-like portion which is perpendicular to the X1 direction and is disposed at a position offset in the X direction from the center of the auxiliary material accommodating container B. Circumferentially of the opening of the yeast accommodating portion 31b, a gasket 31c is provided so as to prevent leak of the yeast E when the yeast lid member 34 closes the yeast accommodating portion 31b.

On the Y1 sides of the base body 31, two bearing portions 31j are formed. And, to these two bearing portions 31j, a shaft 35 is attached in parallel with the X1 direction. At the bearing portions 31j, pins 31k are formed. Each pin 31k comes into engagement with a member (not shown) attached to the lid body 3 when the auxiliary material accommodating container B is attached to the lid body 3, thus fixing the auxiliary material accommodating container B to the lid body 3.

<Lid Member>

The lid member 32 is a member for opening/closing the accommodating portion 31a and includes a cylindrical portion 32a, a cylindrical portion 32b, a connection portion 32c, a lid portion 32d and a recess portion 32e. Inside the cylindrical portion 32a and the cylindrical portion 32b, the shaft 35 extends, whereby the lid member 32 is attached to the base body 31. The cylindrical portion 32a and the cylindrical portion 32b are spaced apart from each other in the direction along the shaft 35 (X1 direction), and between them, a cylindrical portion 33a and a cylindrical portion 33b of the frame member 33 are disposed.

Figure 4:
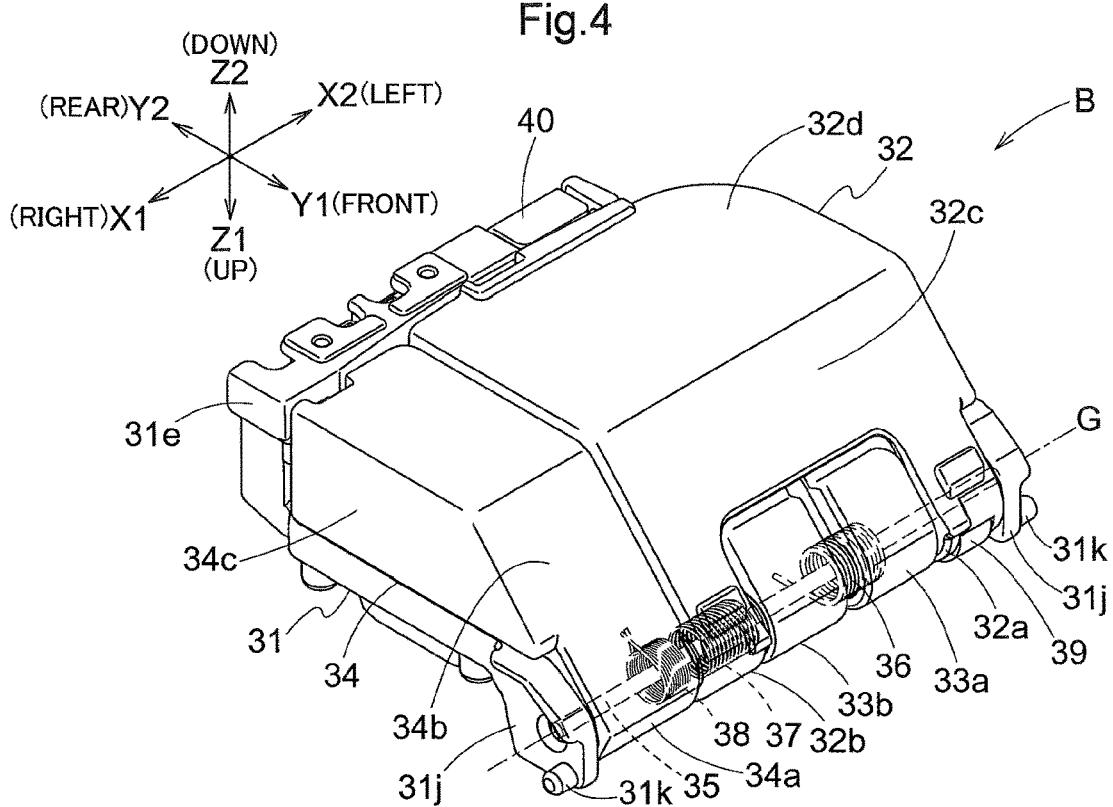
FIG. 4 is a perspective view showing an arrangement of an auxiliary material accommodating container.

The connection portion 32c is a flat face like portion that extends obliquely relative to the X-Y plane (the plane parallel with the X1 direction and the X2 direction) and connects the cylindrical portion 32a and the cylindrical portion 32b to the lid portion 32d. The lid portion 32d is a flat-face like portion and is configured to close the accommodating portion 31a as it covers the opening of the frame portion 33d of the frame member 33 when this lid member 32 is closed (FIG. 4).

Inside the cylindrical portion 32b, a spring 37 (an elastic member) is mounted. This spring 37 comes into contact with both the cylindrical portion 32b and the base body 31 and urges the cylindrical portion 32b so that it may be rotated about the shaft 35 clockwise as seen in the X2 direction. Namely, the lid member 32 is pivotable relative to the base body 31 about the shaft 35 (pivot axis G), thereby to open/close the accommodating portion 31a and the lid member 32 is urged by the spring 37 in the direction for opening the accommodating portion 31a.

The recess portion 32e is formed at an end of the lid portion 32d. When the lid member 32 is closed (FIG. 4), an engagement portion 42b of a lid lock member 42 is hooked to the recess portion 32e, thus keeping the lid member 32 closed.

<Frame Member>

The frame member 33 is a member for opening/closing the accommodating portion 31a in cooperation with the lid member 32 and includes the cylindrical portion 33a, the cylindrical portion 33b, a frame portion 33d and a recess portion 33e. As the shaft 35 extends through inside the cylindrical portion 33a and the cylindrical portion 33b, whereby the frame member 33 is attached to the base body 31. The cylindrical portion 33a and the cylindrical portion 33b are spaced apart from each other in the direction along the shaft 35 (X direction), and are disposed between the cylindrical portion 32a and the cylindrical portion 32b of the lid member 32.

The connection portion 33c is a flat-face like portion that extends obliquely relative to the X-Y plane (plane parallel with the X1 direction and the X2 direction) and connects the cylindrical portion 33a and the cylindrical portion 33b to the frame portion 33d. The connection portion 33c covers a part of the Y1 side of the opening of the accommodating portion 31a as the auxiliary material accommodating container B is seen in the Z1 direction.

The frame portion 33d is a tubular portion which is open in the Z1 direction and the Z2 direction. When the frame member 33 is closed (FIG. 5), the inner face of the frame portion 33d extends continuously with the wall face circumferentially of the accommodating portion 31a. Namely, when the frame member 33 is closed, the frame portion 33d functions as an outer frame of the accommodating portion 31a. In this, the wall face circumferentially of the accommodating portion 31a is extended in the Z2 direction, relative to the state when the frame member 33 is opened (FIG. 6). With this arrangement, when the frame member 33 is closed, as compared with the case of this frame member 33 being opened, it is possible to accommodate a larger amount of food stuff F in the accommodating portion 31a.

Inside the cylindrical portion 33a and the cylindrical portion 33b, a spring 36 (an elastic member) is mounted. This spring 36 comes into contact with both the cylindrical portions 33a, 33b and the base body 31 and urges the cylindrical portion 33a and the cylindrical portion 33b so that they may be rotated about the shaft 35 clockwise as seen in the X2 direction. Namely, the frame member 33 is pivotable relative to the base body 31 about the shaft 35 (pivot axis G), thereby to open/close the accommodating portion 31a and the frame member 33 is urged by the spring 36 in the direction for opening the accommodating portion 31a.

The recess portion 33e is formed at an end of the frame portion 33d. When the frame member 33 is closed (FIG. 4 and FIG. 5), an engagement portion 44b of a frame lock member 44 is hooked to the recess portion 33e, thus keeping the frame member 33 closed.

<Yeast Lid Member>

The yeast lid member 34 is a member for opening/closing the yeast accommodating portion 31b and includes a cylindrical portion 34a, an arm portion 34b, a lid portion 34c and a recess portion 34d. Inside the cylindrical portion 34a, the shaft 35 extends, whereby the yeast lid member 34 is attached to the base body 31.

The arm portion 34b is an arm-like portion that extends obliquely relative to the X-Y plane (plane parallel with the X1 direction and the X2 direction) and connects the cylindrical portion 34a and the lid portion 34c to each other. The lid portion 34c covers a part of the opening of the yeast accommodating portion 31b when the yeast lid member 34 is closed (FIG. 4), thus closing the yeast accommodating portion 31b.

Inside the cylindrical portion 34a, a spring 38 is provided. The spring 38 comes into contact with both the cylindrical portion 34a and the base body 31 and urges the cylindrical portion 34a so that it may rotate about the shaft 35 clockwise as seen in the X2 direction. Namely, the yeast lid member 34 is pivotable relative to the base body 31 about the shaft 35 (pivot axis G), thereby to open/close the yeast accommodating portion 31b and is urged by the spring 37 in the direction for opening the yeast accommodating portion 31b.

The recess portion 34d is formed at an end of the lid portion 34c. When the yeast lid member 34 is closed (FIG. 4), an engagement portion 46b of the yeast lock member 46 is hooked to the recess portion 34d, thus keeping the yeast lid member 34 closed.

Figure 7:
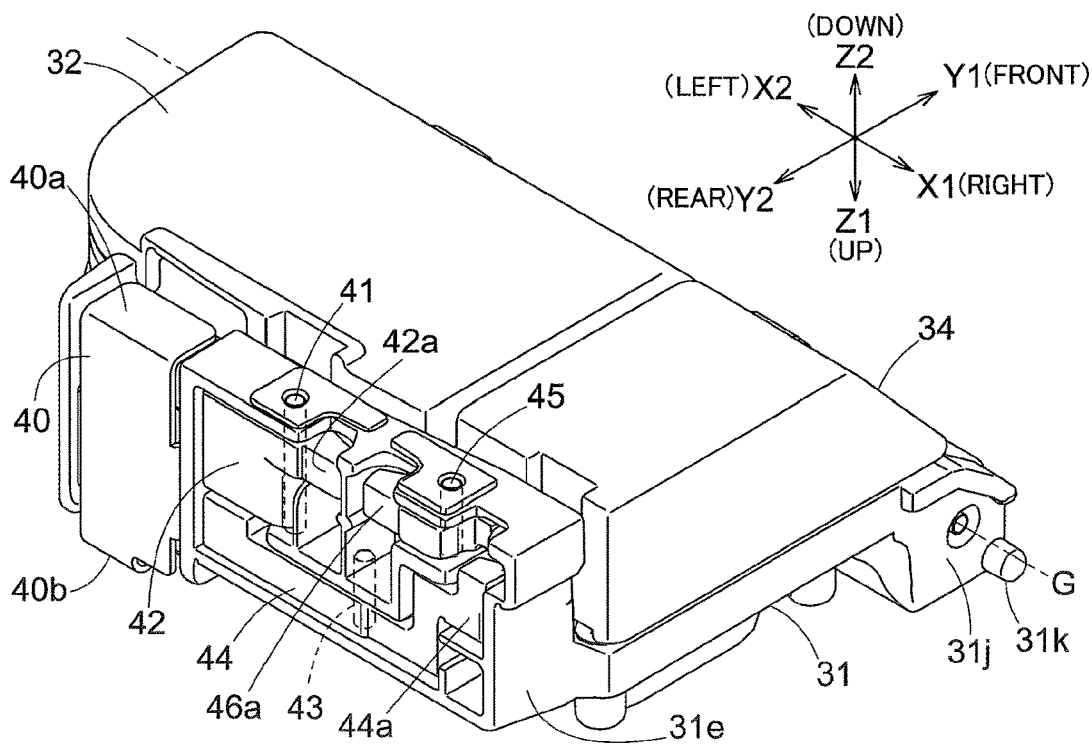
FIG. 7 is a perspective view showing an arrangement of an auxiliary material accommodating container.
Figure 8:
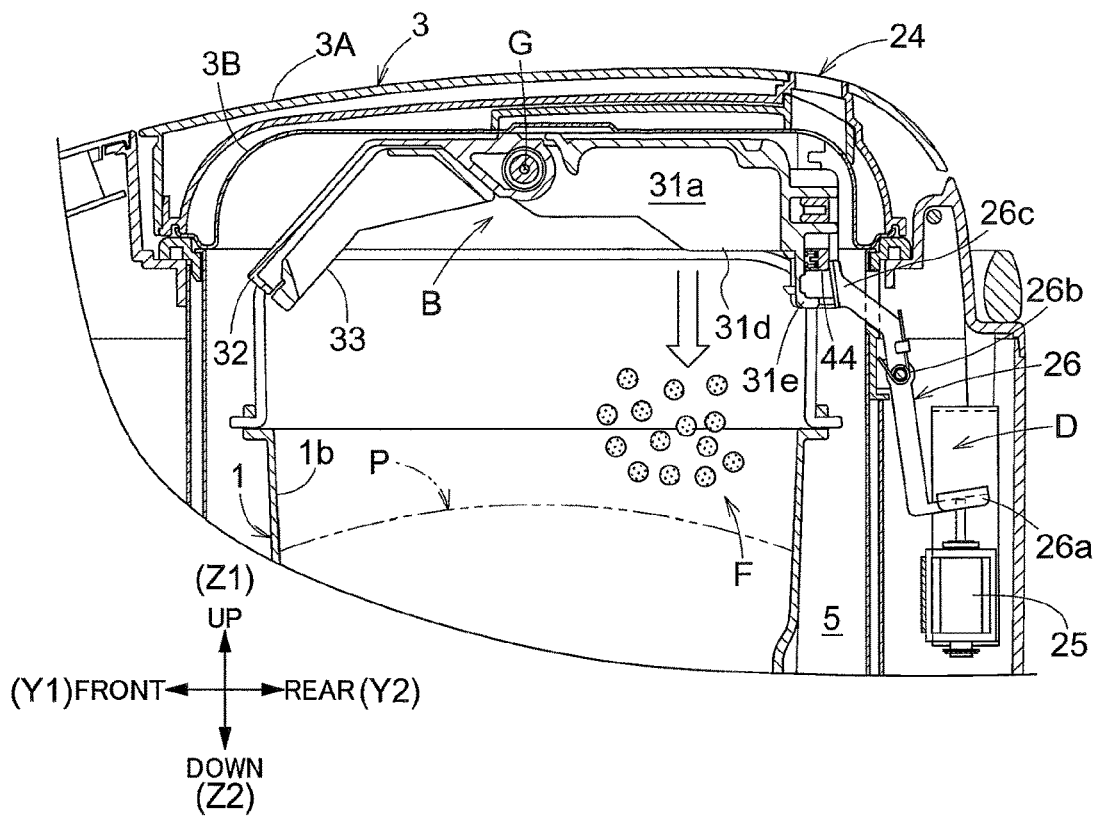
FIG. 8 is a section view showing a condition in which the lid member and the frame member of the auxiliary material accommodating container are opened.

On the Y2 side of the base body 31, thee is formed a lock support portion 31e. As shown in FIG. 7, in the lock support portion 31e, there is formed a portion which is receded toward the Y1 side. In this portion, a container lock member 40, a lid lock member 42, a frame lock member 44 and the yeast lid lock member 46 are disposed.

The container lock member 40 includes an operation portion 40a and an engagement portion 40b. As the engagement member 40b comes into engagement with a member (not shown) attached to the lid member 3 when the auxiliary material accommodating container B is to be attached to the lid body 3, the auxiliary material accommodating container B is fixed to the lid body 3. And, as the operation portion 40a is pressed, the container lock member 40 is pivoted about an axis parallel with the X1 direction. With this, the engagement by the above-described engagement portion 40b is released, so that the auxiliary material accommodating container B can now be detached from the lid body 3.

The lid lock member 42 includes an operation portion 42a and an engagement portion 42b. The lid lock member 42 is attached to the base body 31 via a shaft 41 and is pivotable about the axis parallel with the Z2 direction. The engagement portion 42b extends through a through hole 31f and projects towards the Y1 side of the lock support portion 31e. When the lid member 32 is closed (FIG. 4), the engagement portion 42b of the lid lock member 42 is fitted in the recess portion 32e, thus keeping the lid member 32 closed. When the operation portion 42a is pushed in the Y1 direction, the engagement portion 42b is moved in the Y2 direction. When the engagement portion 42b moves out of the recess portion 32e, under the elastic force of the spring 37, the lid member 32 is pivoted about the pivot axis X, whereby the lid member 32 is opened.

Figure 5:
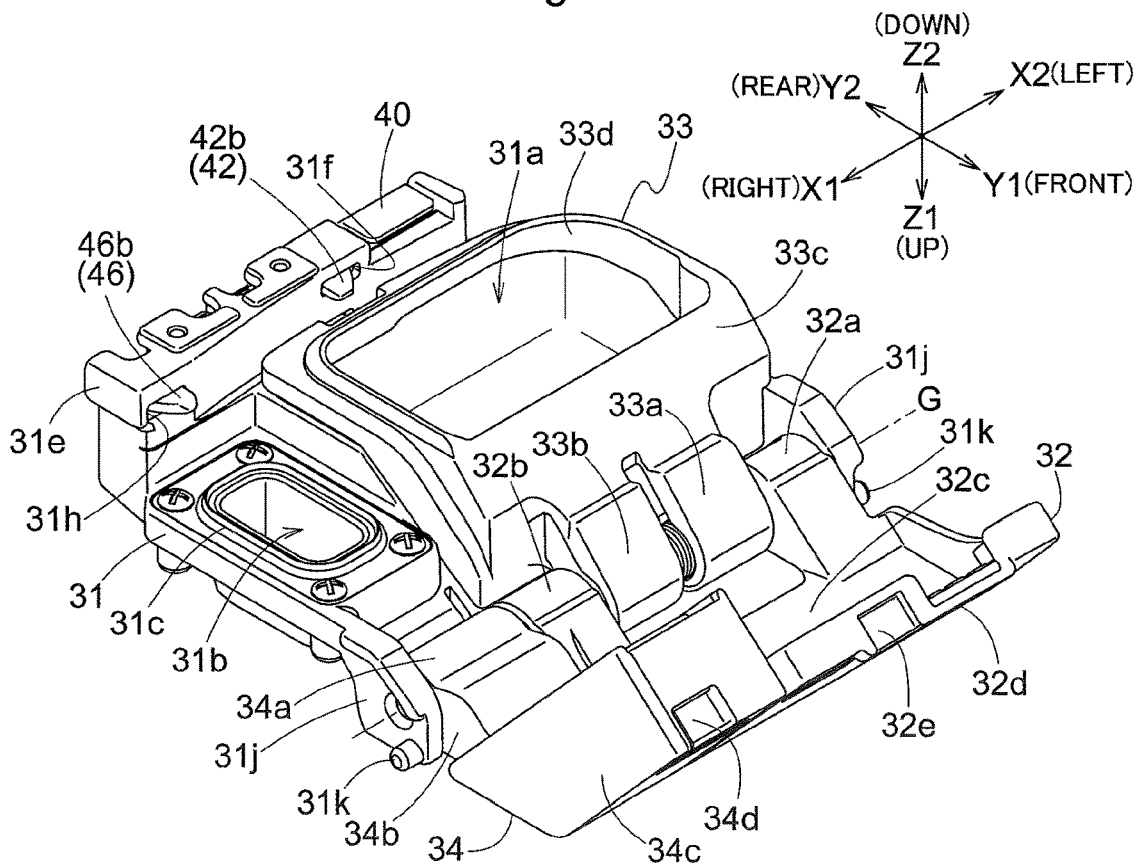
FIG. 5 is a perspective view showing a condition which a lid member and a yeast lid member of the auxiliary material accommodating container are opened.
Figure 6:
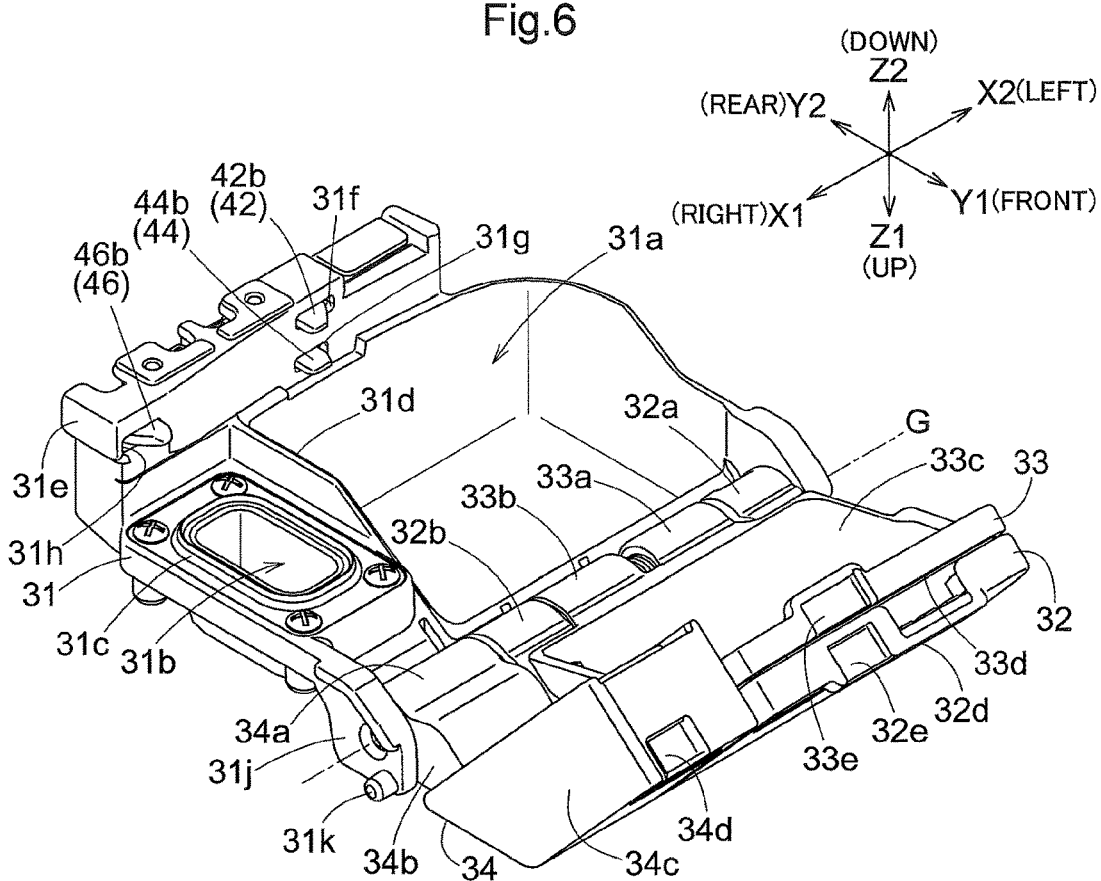
FIG. 6 is a perspective view showing a condition which the lid member, a frame member and the yeast lid member of the auxiliary material accommodating container are opened.

Under the condition illustrated in FIG. 5, namely, under the condition that the lid member 32 is opened and the frame member 33 is closed, if the operation portion 44a is pushed in the Y1 direction, the engagement portion 44b is moved in the Y2 direction, and as the engagement portion 44b moves out of the recess portion 33e, under the elastic force of the spring 36, the frame member 33 is pivoted about the pivot axis X, whereby the frame member 33 is opened.

Under the condition illustrated in FIG. 4, namely, under the condition that both the lid member 32 and the frame member 33 are closed, if the operation portion 44a is pushed in the Y1 direction, the engagement portion 44b is moved in the Y2 direction, when the frame lock member 44 comes into contact with the lid lock member 42, thus pivoting the lid lock member 42 about the shaft 41, so that the engagement portion 42b of the lid lock member 42 is moved in the Y2 direction also. And, as the engagement portion 42b moves out of the recess portion 32e and the engagement portion 44b moves out of the recess portion 33e, under the elastic force of the spring 36, the lid member 32 and the frame member 33 are pivoted about the pivot axis G, whereby the lid member 32 and the frame member 33 are opened.

<Accommodation of Auxiliary Material>

Here, there will be described an operation of accommodating the yeast E and the food stuff F in the auxiliary material accommodating container B, prior to an operation of the automatic bread making machine 100. Firstly, the lid body 3 of the automatic bread making machine 100 is opened (FIG. 3), and by operating the container lock member 40, the auxiliary material accommodating container B is removed from the lid body 3 and the auxiliary material accommodating container B will be placed on a work table, with the base body 31 being oriented downwards.

Figure 3:
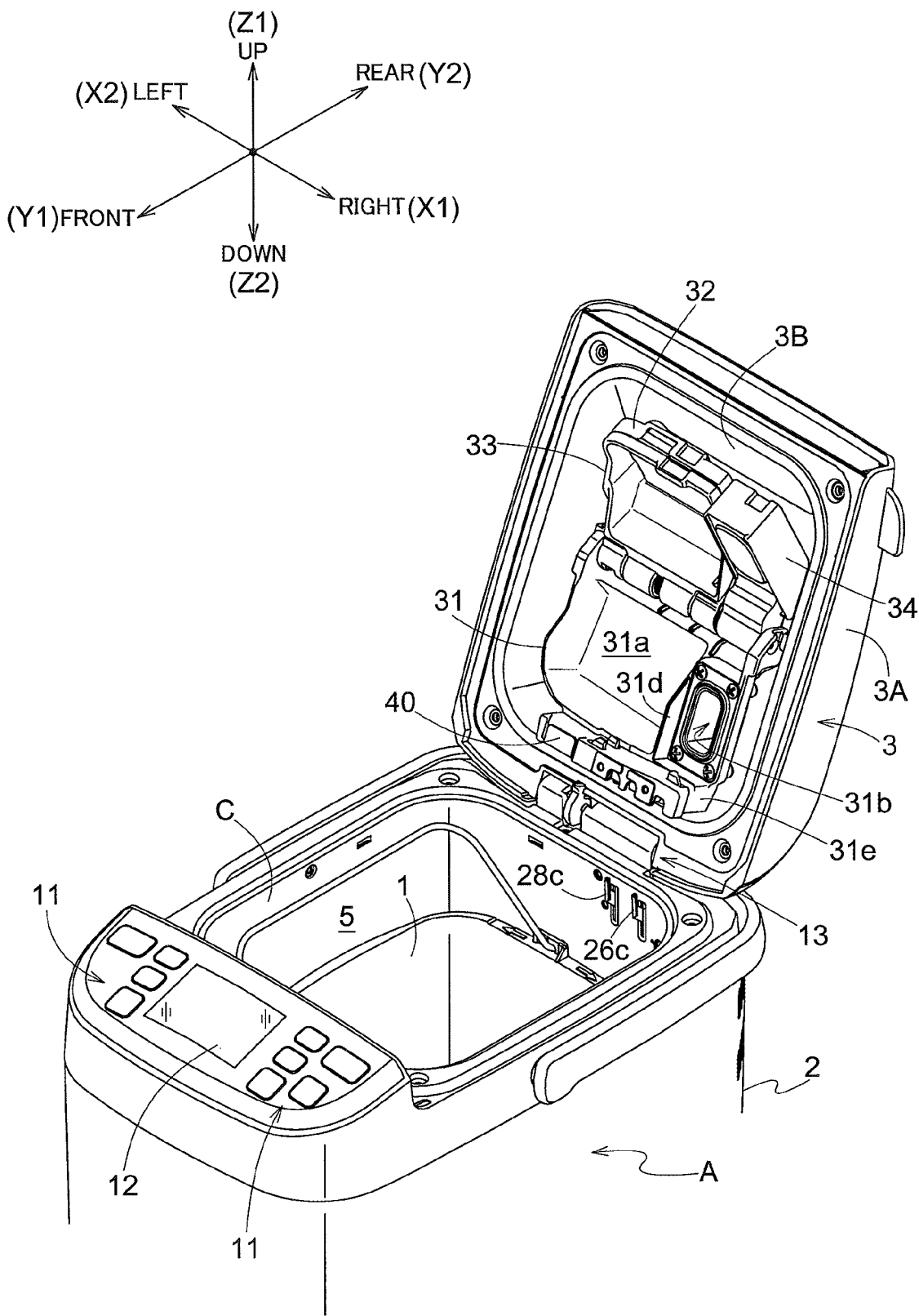
FIG. 3 is a perspective view showing a condition in which a lid body of the automatic bread making machine is opened.

Next, by pressing the operation portion 42a of the lid lock member 42, the lid member 32 is opened and by pressing the operation portion 46a of the yeast lid lock member 46, the yeast lid member 34 is opened (FIG. 5). The food stuff F (resin or nut) is accommodated in the accommodating portion 31a and then the lid member 32 is closed. Then, the yeast E is accommodated in the yeast accommodating portion 31b and the yeast lid member 34 is closed (FIG. 4). Then, the auxiliary material accommodating container B is attached to the lid body 3 (FIG. 3).

Now, let us suppose that the work proceeds in a different sequence from the above. Firstly, the yeast lid member 34 alone is opened and the yeast E is accommodated in the yeast accommodating portion 31b and the yeast lid member 34 is not closed, but the lid member 32 is opened. In this case, if the opening speed of opening the lid member 32 is high, due to shock/vibration resulting from the opening of the lid member 32, it may occur that the yeast E is scattered or leaked from the yeast accommodating portion 31b.

Then, in the case of the auxiliary material accommodating container B relating to this embodiment, the pivoting speed of the lid member 32 in the course of transition from the closing state (FIG. 4) to the first opening state (FIG. 5) is set lower that the pivoting speed of the lid member 32 and the frame member 33 in the course of transition from the closing state (FIG. 4) to the second opening state (FIG. 6). Here, the 'closing state' refers to the state where the lid member 32 and the frame member 33 are closed thus closing the accommodating portion 31a (FIG. 4). The 'first opening state' refers to the state where the lid member 32 is opened to open the accommodating portion 31a (FIG. 5). The 'second opening state' refers to the state where the lid member 32 and the frame member 33 together are opened to open the accommodating portion 31a (FIG. 6). More particularly, the spring 36 and the spring 37 are configured such that the force applied from the spring 37 to the lid member 32 may be smaller than the force applied from the spring 36 to the frame member 33. For instance, an arrangement will be provided such that the spring constant of the spring 37 may be smaller than the spring constant of the spring 36.

With the above-described arrangement, according to the auxiliary material accommodating container B relating to this embodiment, the lid member 32 is opened gently, so that vibration/shock can be reduced, thus suppressing the possibility of scattering or leak of the yeast E from the yeast accommodating portion 31b.

<Charging of Auxiliary Material into Bread Case>

Next, there will be explained an operation of charging the yeast E and the food stuff F from the auxiliary material accommodating container B into the bread case 1 in the middle of an operation of the automatic bread making machine 100.

When timing comes to charge the food stuff F, the controlling section 7 activates the solenoid 25. With this, illustrated in FIG. 8, the solenoid 25 pushes up the lower end 26a of the link member 26, whereby the link member 26 is pivoted counterclockwise about the pivot axis 26a and the upper end 26c collapses forwardly, thereby push the frame lock member 44 of the auxiliary material accommodating container B forwardly. Then, the lid member 32 and the frame member 33 of the auxiliary material accommodating container B are pivoted, whereby the accommodating portion 31a is opened and the food stuff F is charged into the bread case 1. At this timing, the lid member 32 and the frame member 33 respectively assume a posture along the inner face of the heat shielding plate 3B (casing lid). More particularly, the connection portion 32c of the lid member 32 is positioned near the heat shielding plate 3B and assumes a posture parallel with this heat shielding plate 3B.

Further, at the above-described timing, if the lid member 32 and the frame member 32 are together opened to open the accommodating portion 31a (i.e. the second opening state described above), the frame member 33 is placed in contact with the opened lid member 32. Here, since the frame member 33 is urged by the spring 37 in the direction for opening the frame member 33, the frame member 33 is applying a force to the lid member 32 in the direction of opening this lid member 32. With this, the state of both the lid member 33 and the frame member 33 being fully opened together can be maintained in a reliable manner.

Figure 2:
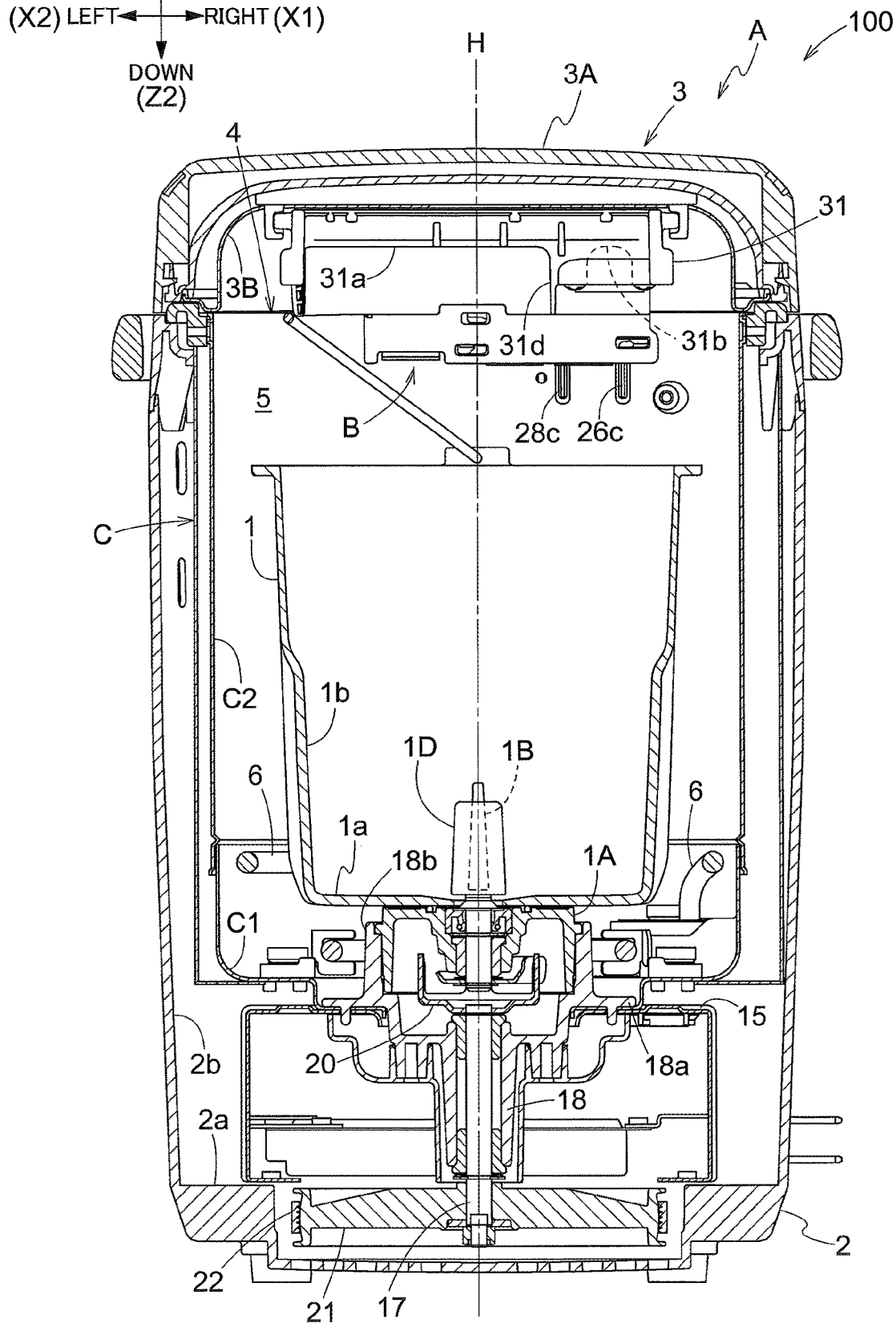
FIG. 2 is a section view showing an arrangement of an automatic bread making machine.

Also, the partition wall 31d of the base body 31 of the auxiliary material accommodating container B is positioned upwardly of the bread case 1. Here, as illustrated in FIG. 2, the partition wall 31d is located at a position offset to the right side from the centerline H of the bread case 1. Namely, in the instant embodiment, the partition wall 31d is disposed at a position offset from the center of the bread case 1 as seen in a plan view.

Figure 9:
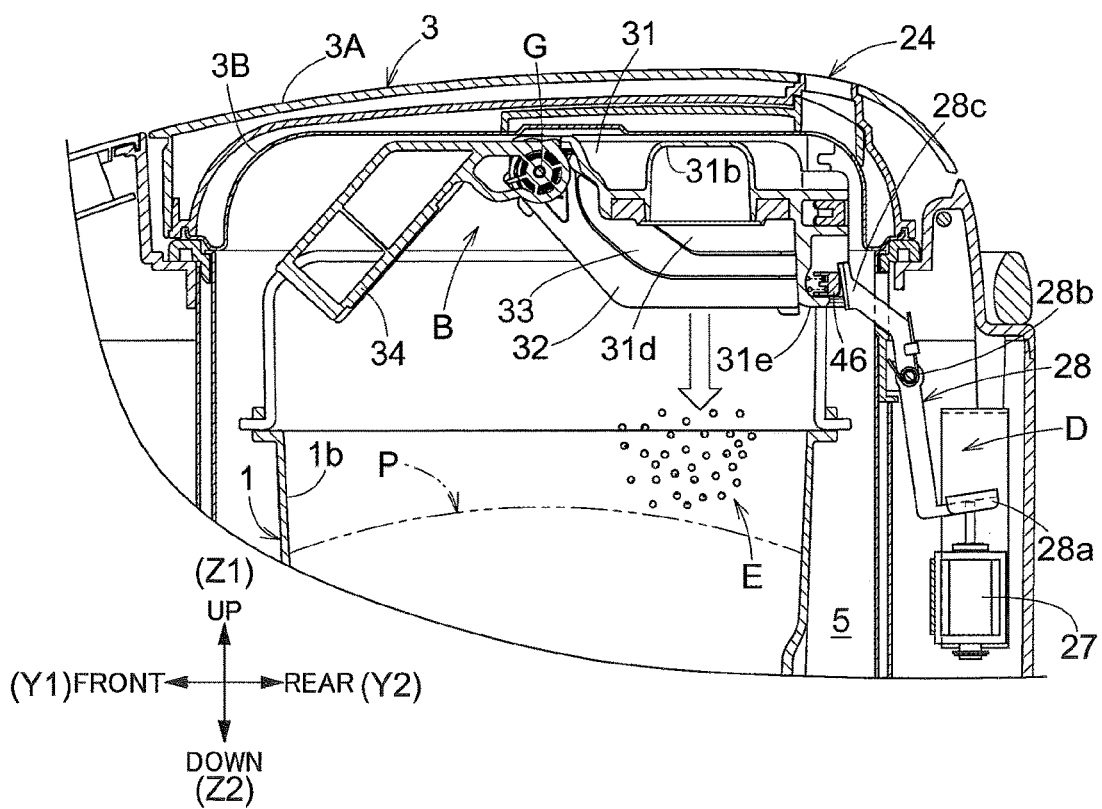
FIG. 9 is a section view showing a condition in which the yeast lid member of the auxiliary material accommodating container is opened.

When timing comes to charge the yeast E, the controlling section 7 activates the solenoid 27. Then, as illustrated in FIG. 9, the solenoid 27 pushes up the lower end 28a of the link member 28. With this, the link member 28 is pivoted counterclockwise about the pivot axis 28b, whereby the upper end 28c collapses forwardly, thereby to push the yeast lid lock member 46 of the auxiliary material accommodating container B forwardly. Then, the yeast lid member 34 of the auxiliary material accommodating container B is pivoted to open the yeast accommodating portion 31b and then the yeast E is charged into the bread case 1. At this timing, the yeast lid member 34 assumes a posture along the inner face of the heat shielding plate 3B (casing lid).

<Braking Mechanism>

Figure 10:
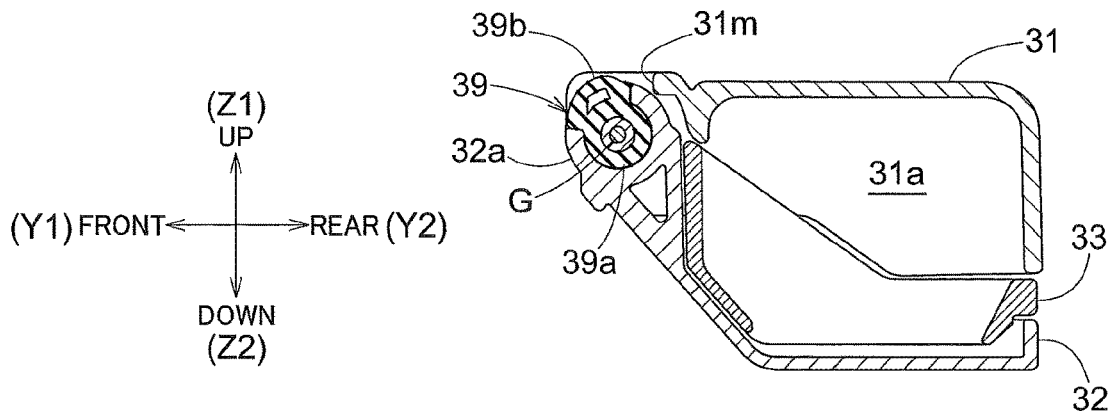
FIG. 10 is a section view showing a positional relationship between a projection member and a braking member.

The auxiliary material accommodating container B is provided with a braking mechanism for suppressing the pivotal motion of the lid member 32. This braking mechanism, as shown in FIGS. 10-12, includes a braking member 39 (a first braking member) provided in the lid member 32 and a projection member 31m (a second braking member) provided in the base body 31.

The braking member 39 includes a cylindrical portion 39a and a contact portion 39b and is formed of a material having elasticity, such as silicone rubber. The braking member 39 is fitted in the cylindrical portion 32a of the lid member 32 under a posture wherein a center axis of the cylindrical portion 39a is in agreement with the pivot axis G. The outer circumference of the contact portion 39b has a fan-shape and its opposed ends come into smooth contact with the outer circumference of the cylindrical portion 32a of the lid member 32. The approximate center portion of the contact portion 39b bulges in the direction away from the pivot axis G, so that the distance between the approximate center of the fan-shape and the pivot axis G is set greater than the distance between each of the opposed ends of the fan shape and the pivot axis G.

The projection member 31m is a projection formed on the Y1 side of the base body 31 and projects towards the pivot axis G in the vicinity of the outer circumference of the cylindrical portion 32a of the lid member 32. As shown in FIG. 10 and FIG. 12, the projection member 31m does not contact the cylindrical portion 32a of the lid member 32. On the other hand, as shown in FIG. 11, the projection member 31m does contact the contact portion 39b of the braking member 39. As this braking member 39 is a member having elasticity, under the state of contact between the braking member 39 and the projection member 31m, due to a friction therebetween or elastic deformation of the braking member 39, there is generated a force that suppresses the pivotal motion of the lid member 32.

Figure 11:
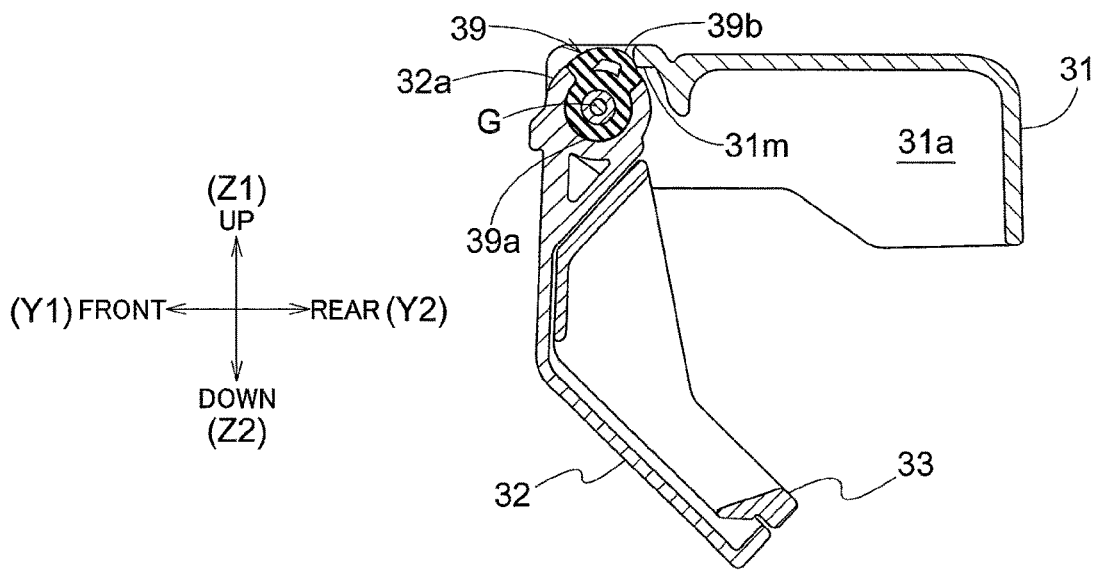
FIG. 11 is a section view showing a positional relationship between the projection member and the braking member.
Figure 12:
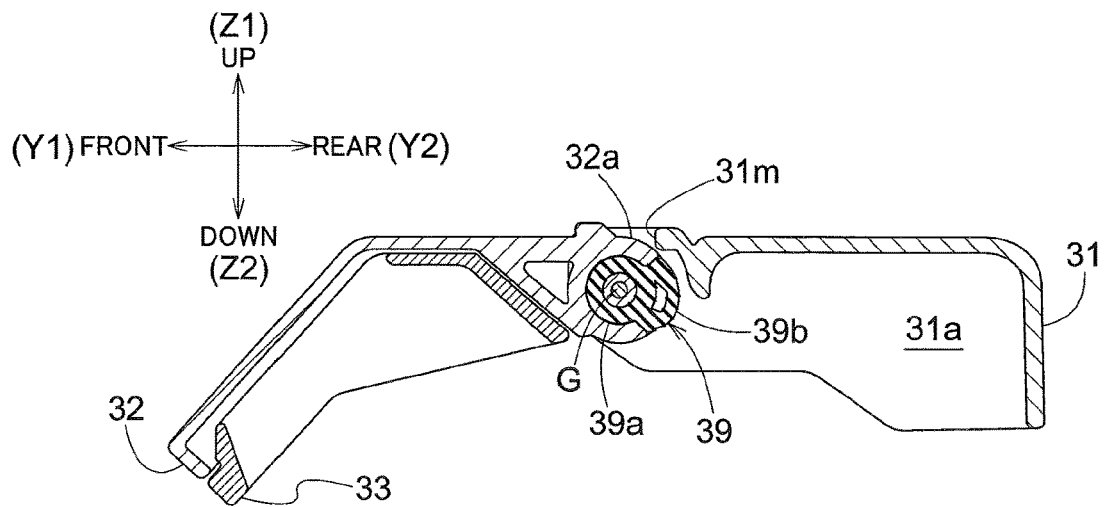
FIG. 12 is a section view showing a positional relationship between the projection member and the braking member.

Then, in the course of transition of the lid member 32 from the closing posture (FIG. 10) to the opening posture (FIG. 12), the braking mechanism assumes the braking state (FIG. 11). Whereas, when the lid member 32 assumes the opening posture (FIG. 12), the braking mechanism assumes the non-braking state. Here, the 'braking state' refers to the state wherein the braking member 39 and the projection member 31m contact each other to suppress pivotal motion of the lid member 32. Whereas, the 'non-braking state' refers to the state wherein the braking member 39 and the projection member 31m are placed apart from each other. The 'closing posture' refers to the posture wherein the lid member 32 closes the accommodating portion 31a (FIG. 10).

Whereas, the 'opening posture' refers to the posture wherein the lid member 32 is pivoted relative to the base body 31 to open the accommodating portion 31a and then becomes still (FIG. 12).

With the above-described braking mechanism, the pivoting speed of the lid member 32 is reduced, thus suppressing generation of shock/noise advantageously.

Further, when the lid member 32 assumes the opening posture, the braking mechanism assumes the non-braking state, so that the lid member 32 can be fully opened.

<Other Embodiments>

(1) In the foregoing embodiment, the auxiliary material accommodating container B is detachably attached to the inner face of the lid member 3. As a modified mode of this, it is possible to arrange such that the auxiliary material accommodating container B is detachably attached to the inner face of the lid body 3.

(2) In the foregoing embodiment, there was explained the example in which the food stuff F (nuts or resin) is accommodated in th first accommodating portion 31a of the auxiliary material accommodating container B and the yeast E is accommodated in the second accommodating portion 31b of the same. Alternatively, the food stuff F may be accommodated in the first accommodating portion 31a and the second accommodating portion 31b. In this case, the food stuff F to be accommodated in the first accommodating portion 31a and the food stuff F to be accommodated in the second accommodating portion 31b may be of a same kind or different kinds.

(3) In the foregoing embodiment, the auxiliary material accommodating container B, as shown in FIG. 1, is attached to the inner face of the heat shielding plate 3B of the lid body 3, at a position where the pivot axis G intersects the centerline H of the bread case 1 and under the posture where the pivot axis G extends parallel with the left-right direction (the X1 direction, X2 direction). The orientation of the pivot axis X may be changed. For instance, the auxiliary material accommodating container B may be disposed under a posture where the pivot axis X forms an angle of 90 degrees relative to the X1 direction, that is, under the posture where the pivot axis X extends parallel with the Y1 direction. Even with the above-described modified arrangement too, as long as the auxiliary material accommodating container B is disposed with the pivot axis X intersecting the centerline H of the bread case 1, it may be said that the auxiliary material accommodating container B is attached to the heat shielding plate 3B of the lid body at a position where the pivot axis G is overlapped with the center of the bread case 1 as seen in the plan view (seen in the Z2 direction).

The arrangement disclosed in the foregoing embodiment can be used in any desired combination with any one or more of the arrangements disclosed in the further embodiments unless no contradiction occurs. Further, it is understood that the embodiments disclosed in this disclosure are only exemplary, and embodiments of the invention are not limited thereto, but can be modified as desired within a range not departing from the object of the invention.

DESCRIPTION OF REFERENCE MARKS/NUMERALS

1: bread case
3B: heat shielding plate (casing lid)
31: base body
31a: accommodating portion (first accommodating portion)
31b: yeast accommodating portion (second accommodating portion)
31d: partition wall
31m: projection member (second braking member)
32: lid member (first opening/closing member)
33: frame member (first opening/closing member)
34: yeast lid member (second opening/closing member)
36: spring (elastic member)
37: spring (elastic member)
39: braking member (first braking member)
100: automatic bread making machine
B: auxiliary material accommodating container
C: casing
G: pivot axis

The invention claimed is:

1. An auxiliary material accommodating container detachably attachable to an automatic bread making machine, wherein:
   the container includes a base body, a first accommodating section, a second accommodating section, a first opening/closing member and a second opening/closing member;
   the first opening/closing member is pivotable relative to the base body about a pivot axis to open/close the first accommodating section; and
   the second opening/closing member is pivotable relative to the base body about the pivot axis to open/close the second accommodating section,
   wherein:
   the container includes a braking mechanism for braking a pivotal movement of the first opening/closing member;
   the braking mechanism includes a first braking member provided in the first opening/closing member and a second braking member provided in the second opening/closing member, the first braking member and the second braking member coming into contact with each other to provide a braking state, the first braking member and the second braking member moving away from each other to provide a non-braking state;
   the first opening/closing member selectively assumes a closing posture to close the first accommodating section and an opening posture when the first opening/closing member is pivoted relative to the base body to open the first accommodating section, then becoming still; and
   the braking mechanism provides the braking state in the middle of transition of the first opening/closing member from the closing posture to the opening posture, whereas the braking mechanism provides the non-braking state when the first opening/closing member assumes the opening posture.

2. An auxiliary material accommodating container detachably attachable to an automatic bread making machine, wherein:
   the container includes a base body, a first accommodating section, a second accommodating section, a first opening/closing member, and a second opening/closing member;
   the first opening/closing member is pivotable relative to the base body about a pivot axis to open/close the first accommodating section; and
   the second opening/closing member is pivotable relative to the base body about the pivot axis to open/close the second accommodating section,
   wherein:
   the first opening/closing member includes a lid member and a frame member;

the lid member and the frame member are pivotable relative to the base body about the pivot axis to open the first accommodating section, the lid member and the frame member being urged by an elastic member in a direction for opening the first accommodating section;

the first opening/closing member selectively assumes a closing state in which the lid member and the frame member are closed to each other to close the first accommodating section, a first opening state in which the lid member is opened to open the first accommodating section, and a second opening state in which the lid member and the frame member together are opened to open the first accommodating section; and a pivoting speed of the lid member at the time of transition from the closing state to the first opening state is set lower than a pivoting speed of the lid member and the frame member at the time of transition from the closing state to the second opening state.

3. The auxiliary material accommodating container of claim 2, wherein in the second opening state, the frame member applies a force to the lid member in a direction for opening this lid member.

4. An automatic bread making machine, comprising:

an auxiliary material accommodating container detachably attachable to the automatic bread making machine, wherein:

the container includes a base body, a first accommodating section, a second accommodating section, a first opening/closing member and a second opening/closing member;

the first opening/closing member is pivotable relative to the base body about a pivot axis to open/close the first accommodating section;

the second opening/closing member is pivotable relative to the base body about the pivot axis to open/close the second accommodating section;

the machine further comprises a bread case that accommodates therein bread materials;

the auxiliary material accommodating container is disposed on the machine upwardly of the bread case;

the machine further includes a casing that accommodates the bread case;

the casing includes a casing lid for opening/closing the top of the casing;

the auxiliary material accommodating container is attached to the casing lid at a position where the pivot axis is overlapped with the bread case as seen in a plan view;

the first opening/closing member assumes a posture along an inner face of the casing lid when the first accommodating section is opened; and the second opening/closing member assumes a posture along the inner face of the casing lid when the second accommodating section is opened.

5. The automatic bread making machine of claim 4, wherein:

the auxiliary material accommodating container has a partition wall that partitions between the first accommodating section and the second accommodating section; and when the auxiliary material accommodating container is attached to the casing lid, the partition wall is disposed at a position offset from the center of the bread case as seen in a plan view.

\* \* \* \* \*